United States Patent
Thai

(10) Patent No.: US 9,283,528 B2
(45) Date of Patent: Mar. 15, 2016

(54) BLENDER JUG AND COUPLING

(75) Inventor: Khon Thai, Beverly Hills (AU)

(73) Assignee: Breville Pty Limited, Alexandria, NSW (AU)

( * ) Notice: Subject to any disclaimer, the term of this patent is extended or adjusted under 35 U.S.C. 154(b) by 339 days.

(21) Appl. No.: 13/991,902

(22) PCT Filed: Nov. 28, 2011

(86) PCT No.: PCT/AU2011/001542
§ 371 (c)(1),
(2), (4) Date: Jun. 6, 2013

(87) PCT Pub. No.: WO2012/075522
PCT Pub. Date: Jun. 14, 2012

(65) Prior Publication Data
US 2013/0264403 A1    Oct. 10, 2013

(30) Foreign Application Priority Data

Dec. 7, 2010   (AU) .................................. 2010905366
Jul. 15, 2011   (AU) .................................. 2011902858

(51) Int. Cl.
| A47J 43/06 | (2006.01) |
| B01F 7/16 | (2006.01) |
| A47J 43/046 | (2006.01) |
| A47J 43/08 | (2006.01) |
| B02C 18/06 | (2006.01) |

(52) U.S. Cl.
CPC ............... *B01F 7/162* (2013.01); *A47J 43/046* (2013.01); *A47J 43/085* (2013.01); *B02C 18/06* (2013.01)

(58) Field of Classification Search
CPC ...... A47J 43/046; A47J 43/04; A47J 43/0465; A47J 43/085; B01F 7/162
USPC .................... 241/282.1, 282.2, 91, 92, 278.1; 99/510, 492; 366/199, 205
See application file for complete search history.

(56) References Cited

U.S. PATENT DOCUMENTS

| 2,304,476 | A * | 12/1942 | Poplawski ................. 241/282.2 |
| 6,715,706 | B1 * | 4/2004 | Planca et al. .................... 241/36 |
| 7,387,269 | B2 * | 6/2008 | Mally ........................ 241/282.1 |
| 7,600,706 | B2 * | 10/2009 | Huang ......................... 241/37.5 |
| 7,690,592 | B2 * | 4/2010 | Ferraby ........................... 241/92 |
| 8,226,021 | B2 * | 7/2012 | Wilson ............................ 241/92 |
| 2002/0012288 | A1 * | 1/2002 | Masip et al. .................. 366/205 |
| 2007/0140048 | A1 * | 6/2007 | Ismail .......................... 366/205 |
| 2011/0096619 | A1 * | 4/2011 | Pryor et al. .................... 366/205 |
| 2011/0149677 | A1 * | 6/2011 | Davis et al. .................... 366/205 |
| 2015/0036459 | A1 * | 2/2015 | Holm ........................... 366/205 |

* cited by examiner

*Primary Examiner* — Faye Francis
(74) *Attorney, Agent, or Firm* — Molins and Co. Pty. Ltd

(57) ABSTRACT

A blade assembly for use with a jug having a central throat, the blade assembly includes: one or more blades; a plug element having a peripheral annular flange; a seal element located below the annular flange; a coupling component for engaging a co-operating coupling component on a blender base, the coupling component being coupled to the one or more blades by a rotatable shaft assembly; and a locking element for retaining the plug element with the seal element sealingly engaging the jug, thereby providing a sealing arrangement between the blade assembly and the jug.

16 Claims, 15 Drawing Sheets

BLENDER JUG AND COUPLING

FIELD OF THE INVENTION

The invention relates to blenders and more particularly to kitchen blenders.

The invention has been developed primarily as a blender jug and coupling and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Kitchen blenders are used in domestic and commercial settings to liquefy food ingredients, mix ingredients, crush ice etc. Generally, a blender consists of a base, a jug and a lid. It is preferred that the jug have a removable blade assembly. Removable blades allow for a thorough cleaning of both the jug and the blades. However, a removable blade assembly must take into account the potential for leakage and the dress leakage from the jug with mechanical seals. Glass jugs are preferred by many users. Plastic jugs are also well known. However, the qualities of glass do not include the ability to economically shape glass with the close tolerances and accuracy of moulding associated with plastic. Accordingly, providing a sealing arrangement between a removable blade assembly and a glass jug is more technically challenging and often more expensive than a similar arrangement involving a plastic jug.

A jug for a motorised blender generally comprises a blade assembly. The blade assembly comprises a rotating blade, a shaft, suitable bearings and a coupling. The coupling cooperates with another coupling part on the base of the blender. The jug is normally fabricated from glass or plastic and then permanently, semi-permanently or removably attached to the blade assembly. Because the manufacturing tolerances (in particular with a glass jug) are somewhat coarse, care must be taken in the way that the blade assembly is affixed and sealed to the jug. Coupling the blade assembly to the motorised based requires concentricity and the correct longitudinal spacing. Further, the blade assembly itself must be stabilised relative to the jug to avoid unnecessary movement wear and vibration. Further, the blade assembly must be sealed in a way that prevents the contents of the jug from leaking past the blade assembly. A mechanical solution to these problems is also provided herewith.

OBJECT OF THE INVENTION

It is an object of the present invention to overcome or ameliorate at least one of the disadvantages of the prior art, or to provide a useful alternative.

It is an object of the invention in a preferred form to provide a blender jug having a reliable and smoothly operating blade assembly.

It is another object of the invention in a preferred form to provide a jug collar that is affixable to a jug, that collar providing a stabilising ring for the blade assembly.

It is another object of the invention in a preferred form to a jug with a removable blade assembly that is easy to assemble and that provides reliable sealing.

It is another object of the invention in a preferred form to provide a kitchen blender jug having a stabilised blade assembly.

It is another object of the invention in a preferred form to provide a kitchen blender having removable blades.

It is another object of the invention in a preferred form to provide a mechanical arrangement between a glass or plastic jug and a removable coupling assembly that is easy to use, easy to clean and convenient.

SUMMARY OF THE INVENTION

According to an aspect of the invention there is provided a blender jug assembly comprising:
 a vessel;
 a collar located at the base of the vessel; and
 a blade assembly supported by the collar and sealingly engaging the jug.

Preferably, the blade assembly comprises one or more rotating blender blades. More preferably, the blades are carried by a shaft that is connected to a blade coupling.

Preferably, the collar has a centrally located stabilising ring for locating or retaining the vessel. More preferably, the collar includes a plurality of upright lugs that assist in establishing a correct orientation and spacing of the vessel relative to the collar. Most preferably, the collar includes one or more flexible teeth adapted to engage a shoulder formed proximal to the terminal extremity of the vessel's throat for capturing the vessel.

Preferably, the collar has a centrally located stabilising ring having one or more tabs defined by vertical slots. More preferably, a tab can be stiffened by reinforcing ribs. Most preferably, the tabs can releasably retain the blade assembly.

Preferably, the collar comprises an exterior skirt and has a generally funnel shaped upper surface for receiving the vessel. More preferably, the collar preferably has a plurality of drainage apertures.

Preferably, the blade assembly comprises an externally threaded portion located below an annular flange. More preferably, an annular seal element is located below the annular flange. Most preferably, the seal element provides a sealing arrangement between a blade assembly and the jug.

Preferably, blade assembly and collar include cooperating retaining elements to resist or restrict separation of the blade assembly and collar when fully engaged. More preferably, the blade assembly includes a circumferential rim and a stabilising ring of the collar includes a circumferential retaining lip or bead, such that when fully engaged with the collar, the retaining lip flex rides past the rim for resisting or restricting separation of the blade assembly and collar. More preferably, blade assembly and collar are restricted from separating even if the lock ring is removed.

Preferably, the blender jug assembly comprises a locking element or ring. More preferably, the blades assembly comprises a blade coupling that is smaller in diameter than the flange and the external threaded portion, thereby enabling the blade coupling to be inserted from above into an internally threaded central opening of a locking ring. Most preferably, the internally threaded central opening of a locking ring engages the cooperating threads on the external threaded area of the blade assembly.

Preferably, the locking ring includes an external grip or sidewall to assist removal.

Alternatively, the locking ring preferably does not includes an external grip or sidewall to restrict removal. More preferably, this locking ring can include a the circumferential flange or web that is sized to fit within a circumferential surface of the collar. Most preferably, this locking ring can include one or more removal elements for co-operation with a tool to remove the locking ring.

According to an aspect of the invention there is provided a blade assembly for use with a jug having a central throat, the blade assembly includes:
- one or more blades;
- a plug element having a peripheral annular flange;
- a annular seal element located below the annular flange;
- a coupling component for engaging a co-operating coupling component on a blender base, the coupling component being coupled to the one or more blades by a rotatable shaft assembly.

Preferably, the assembly includes a locking element for retaining the plug element with the seal element sealingly engaging the jug, thereby providing a sealing arrangement between the blade assembly and the jug.

Preferably, the blade assembly is removably engagable to the jug.

Preferably, the plug element further comprises a circumferential groove located below the flange for receiving an portion of the seal element.

Preferably, the plug element further comprises an interior sleeve portion having an exterior thread; and an exterior sleeve portion surrounding the inner sleeve portion. More preferably, the exterior sleeve portion further comprises two integrally formed flexible tongue elements. Most preferably, each tongue element has a ridge protrusion proximal a lower extremity.

Preferably, the jug including a lower housing having a central opening surrounded by an substantially flat underside landing, for releasable retaining engagement with the ridges of the tongues of the assembly.

Preferably, the plug element further comprises a plurality of guide flats located within a circumferential area below the annular flange, wherein adjacent guide flats being separated by a respective gap.

Preferably, the locking element is a locking ring for retaining the plug element within the throat of the jug. More preferably, the plug element comprises an interior sleeve portion having an exterior thread, and an exterior sleeve portion surrounding the inner sleeve portion. Most preferably, the locking ring comprises a locking collar having an annular outer locking flange; the locking collar being internally threaded for threadedly engaging the inner sleeve portion of the plug element. The locking ring preferably further comprises an upper groove between the collar and the locking flange for receiving the lower extent of the exterior sleeve.

Preferably, the plug element includes a cap element coupled to an upper surface, the cap element having a circumferential shoulder that is moulded into the thickness of the annular flange.

Preferably, the annular seal element is a polymeric seal. More preferably, the annular seal element removable. Most preferably, the annular seal element is wedge shaped. Alternatively, the annular seal element is preferably flat.

Preferably, the jug has a central throat located at a floor of the interior of the jug for receiving the plug element, the throat comprising a vertical neck having a substantially flat circumferential landing. More preferably, the seal element co-operates with a flat circumferential landing.

Preferably, the throat of the jug includes one or more abutment surfaces for restricting rotation of the plug element.

Preferably, the jug or vessel is glass.

According to the invention there is provided a jug with a removable blade assembly, comprising a removable blade assembly as herein described, thereby providing a sealing arrangement between the blade assembly and the jug.

According to the invention there is provided a blender comprising: a motorised base having an external motor driven coupling; and a jug with a blade assembly as herein described; wherein the base is adapted to removably receive the jug.

According to an aspect of the invention there is provided a jug having a central throat. The throat includes opposed flat surfaces. A removable blade assembly is also provided. A removable blade assembly includes an upper flange below which is located a seal. A seal co-operates with a flat landing that surrounds the throat. The removable blade assembly also comprises an array of circumferential flat spots that engage with the flaps of the throat to prevent the removable blade assembly from rotating when in use.

BRIEF DESCRIPTION OF THE DRAWING FIGURES

In order that the invention be better understood, reference is now made to the following drawing figures in which.

Figure 6:
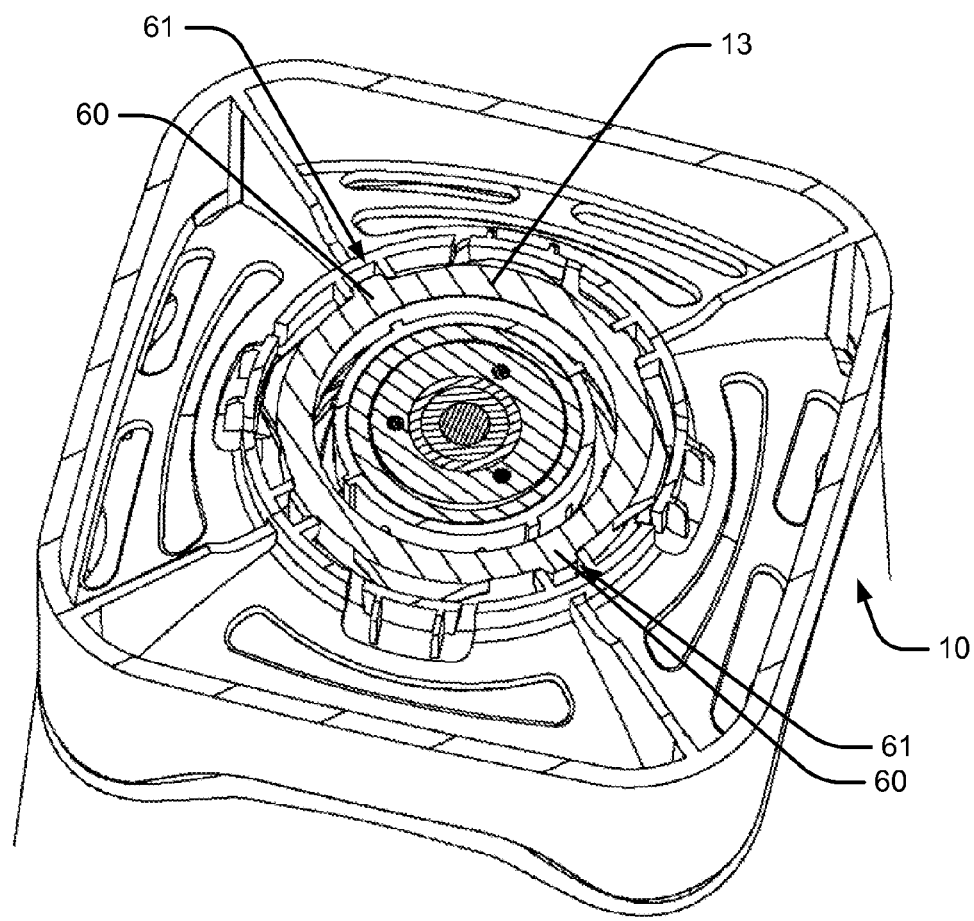
Figure 7:
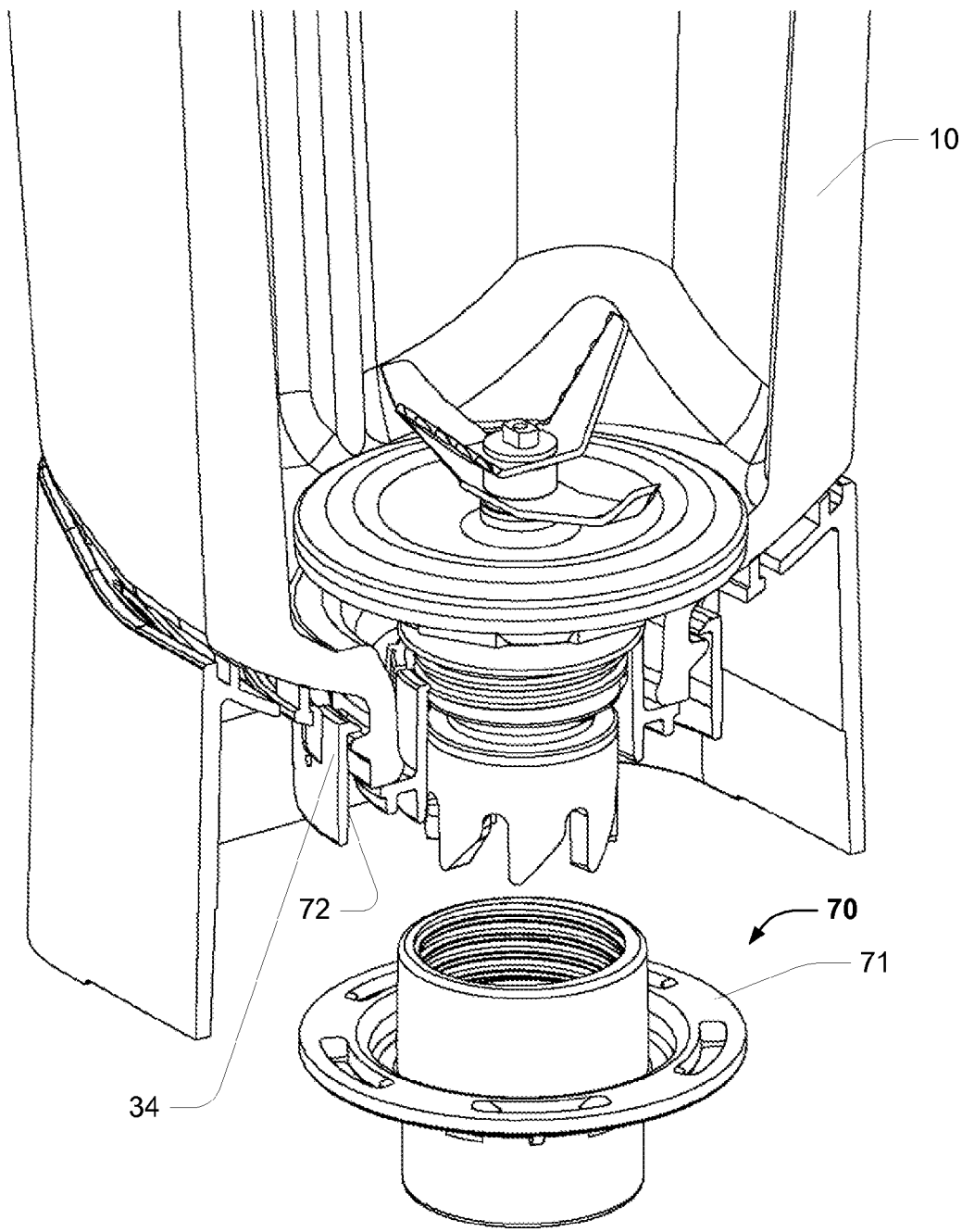
Figure 8:
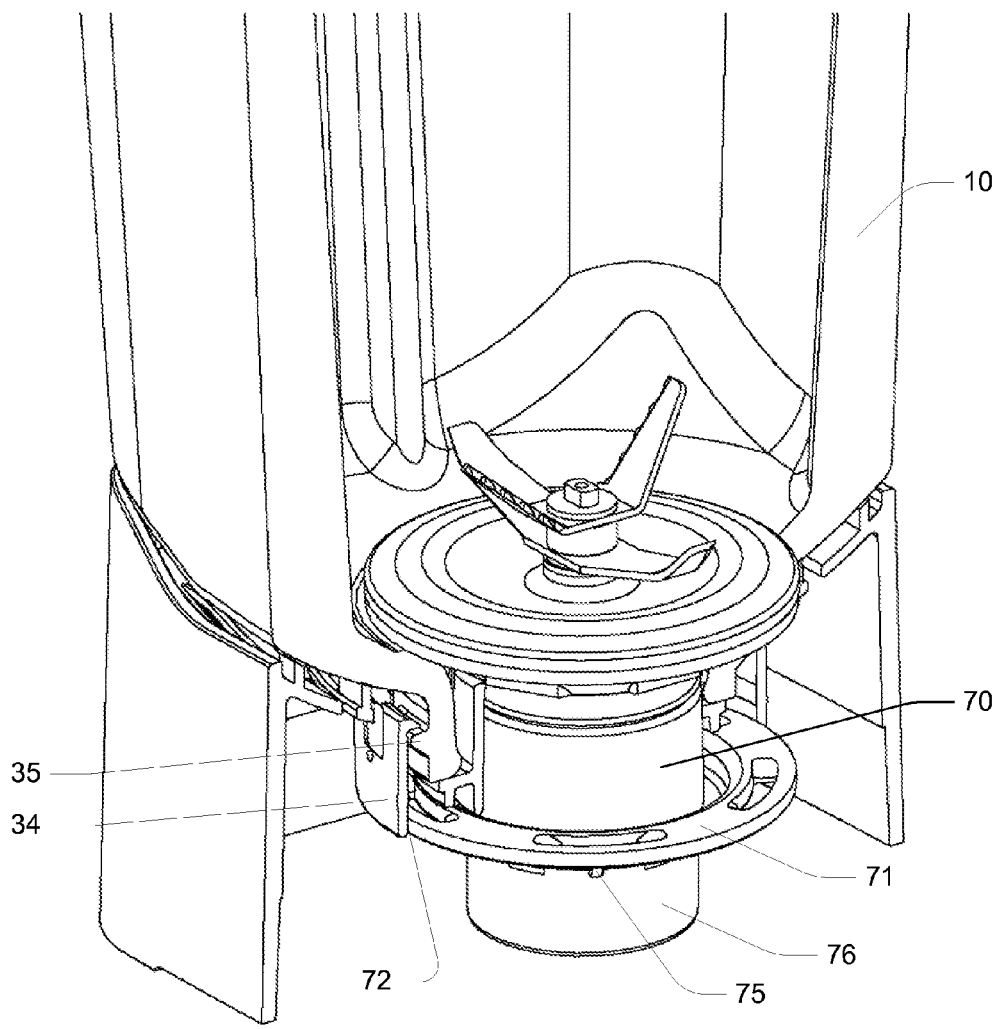
Figure 9:
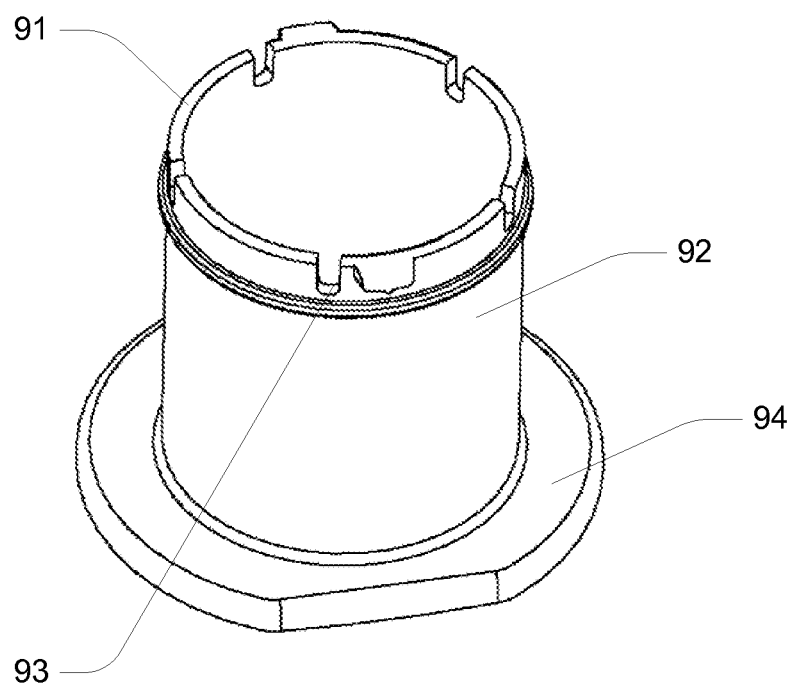

FIG. 6 an inverted perspective, cross sectioned through the stabilizing ring;

FIG. 7 is a cross section of a jug;

FIG. 8 is another cross sectional view of the subject matter shown in FIG. 7;

FIG. 9 is a perspective view of a blender lid's cap.

Figure 10:
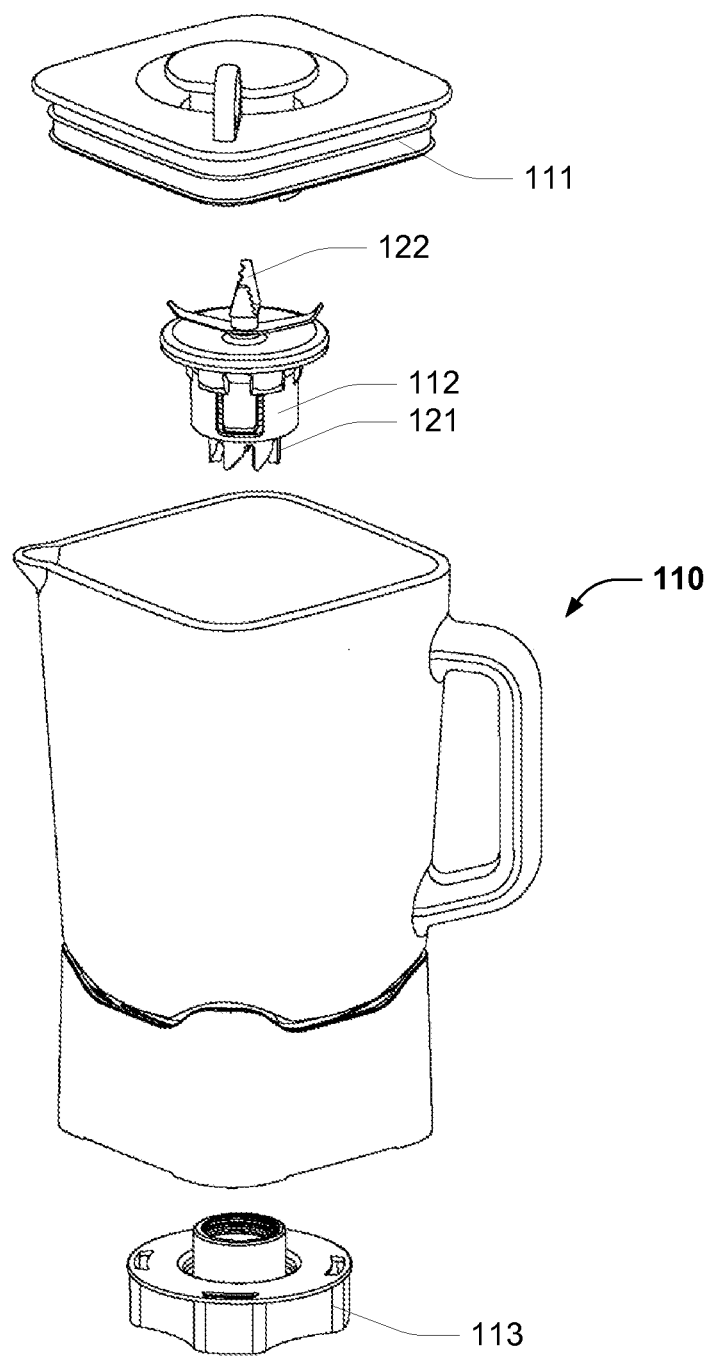
Figure 11:
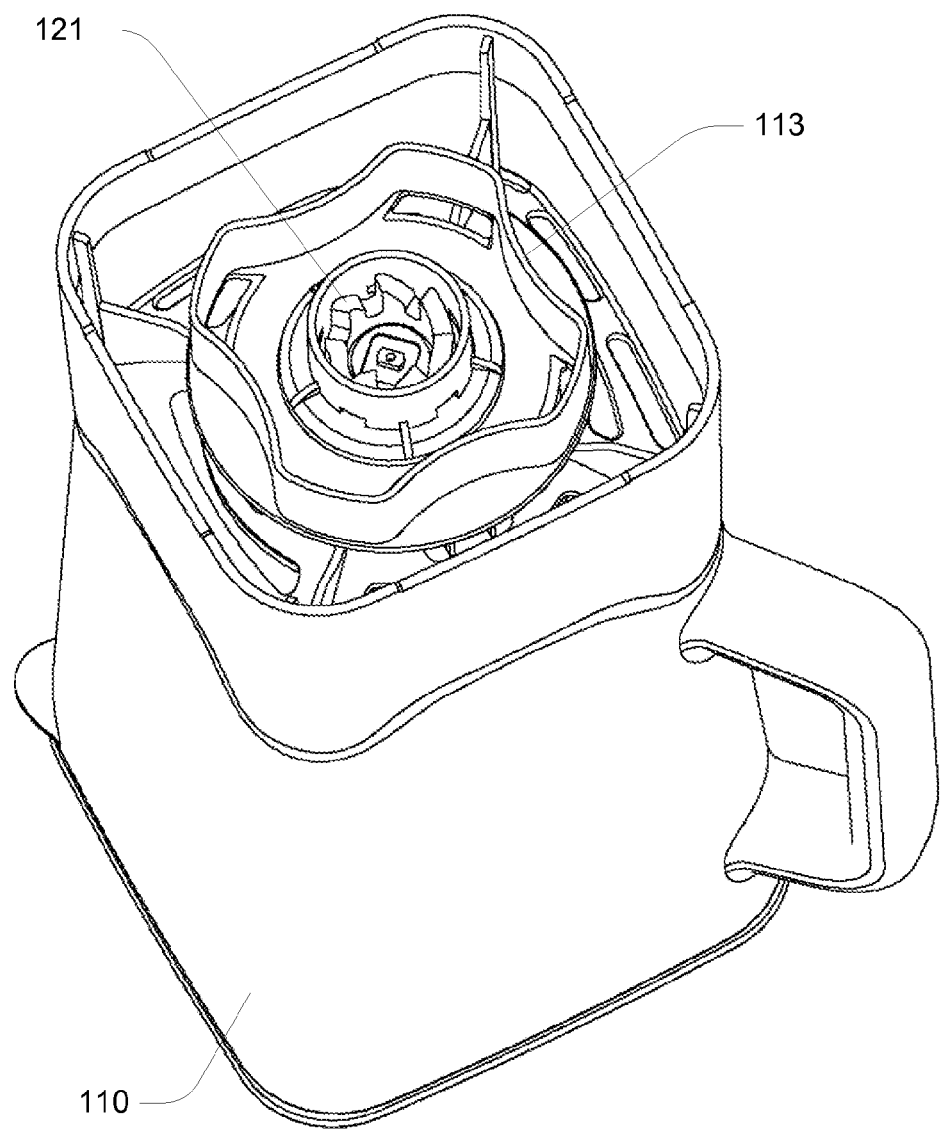
Figure 12:
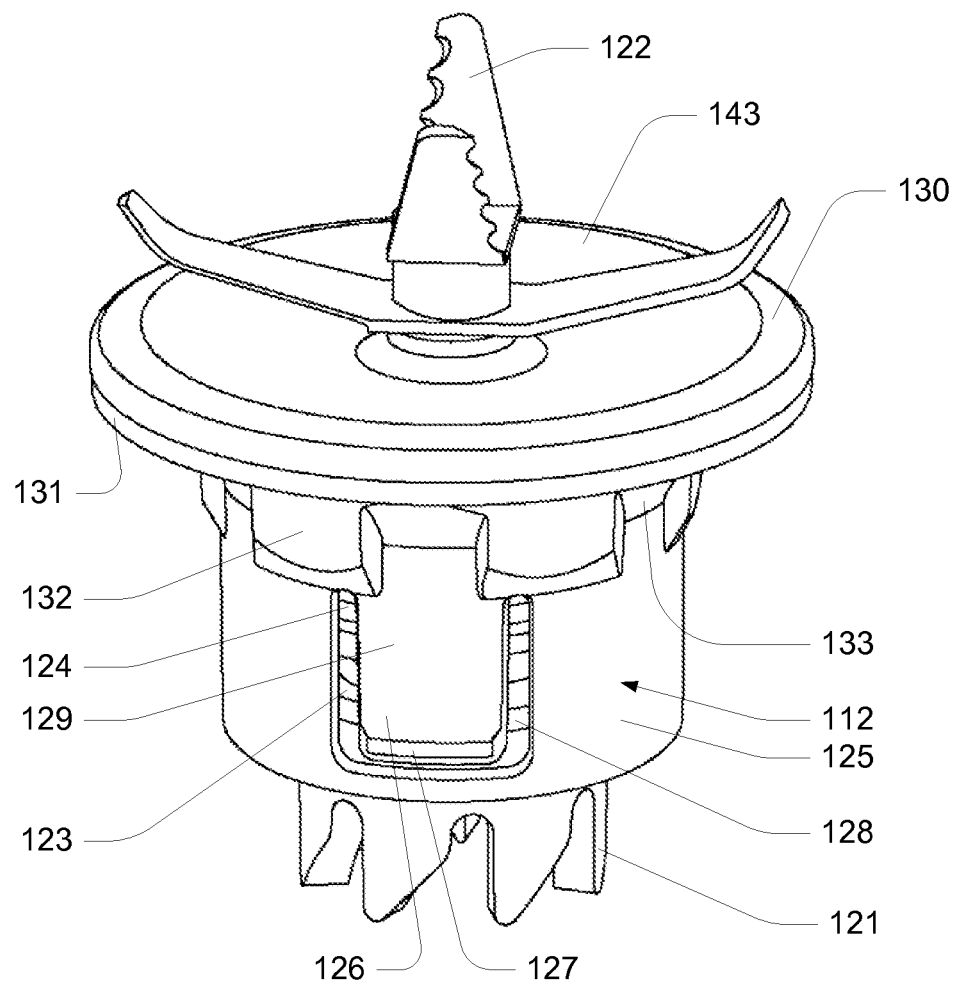
Figure 13:
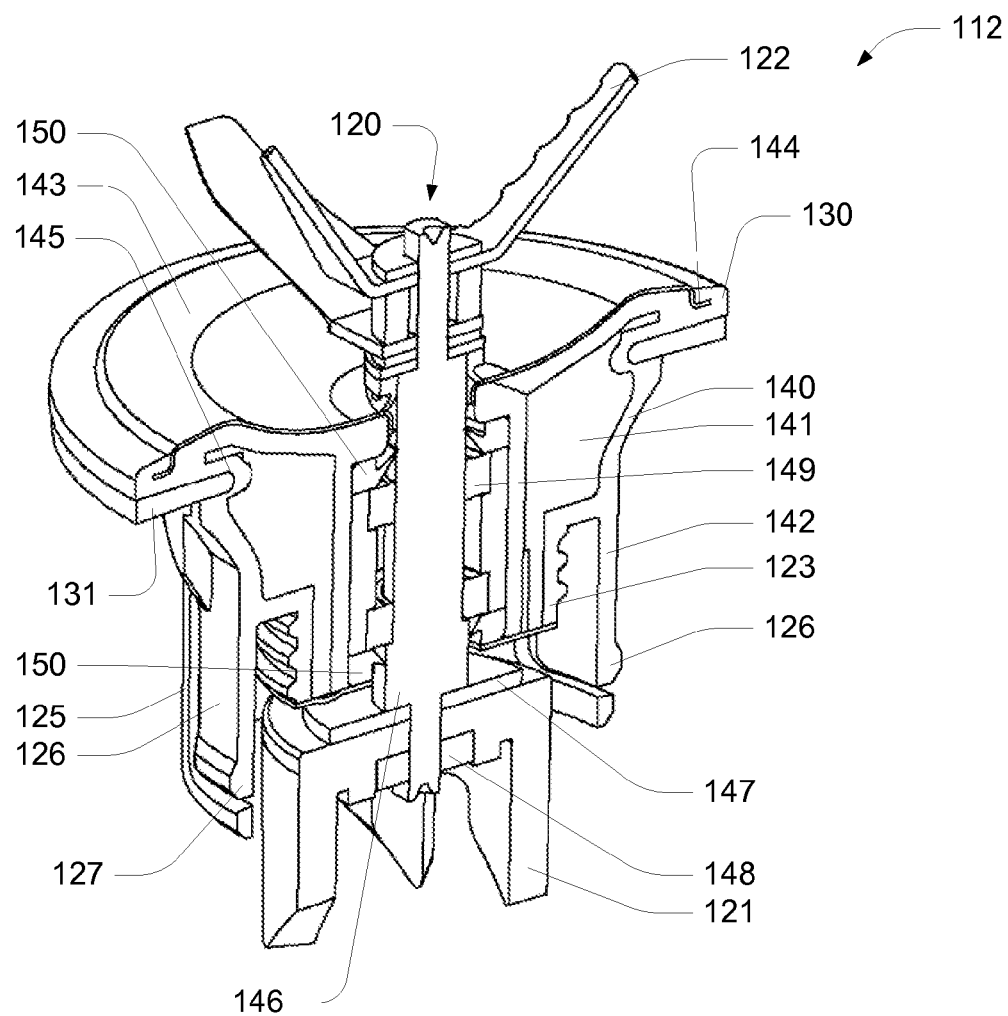
Figure 14:
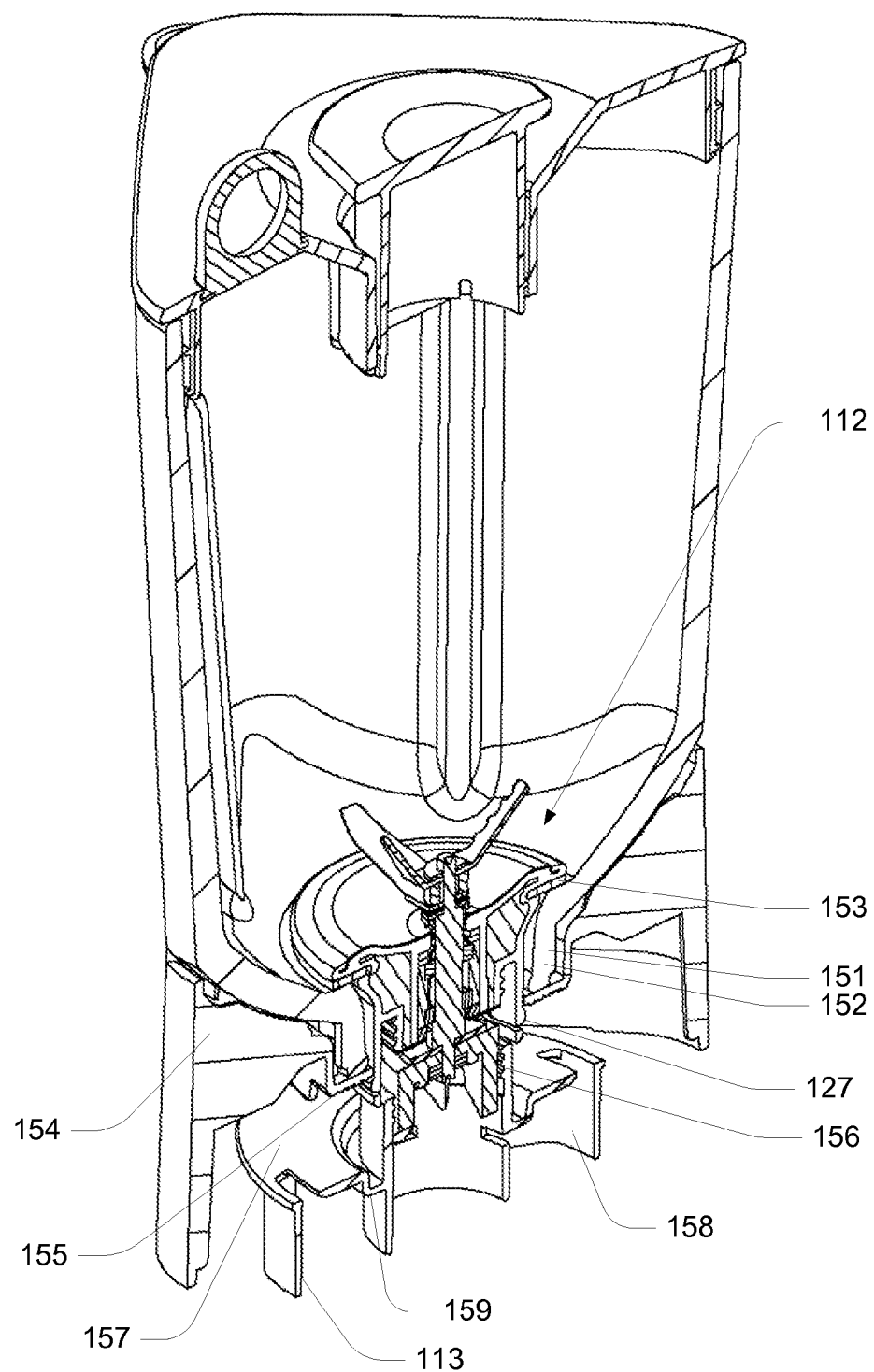
Figure 15:
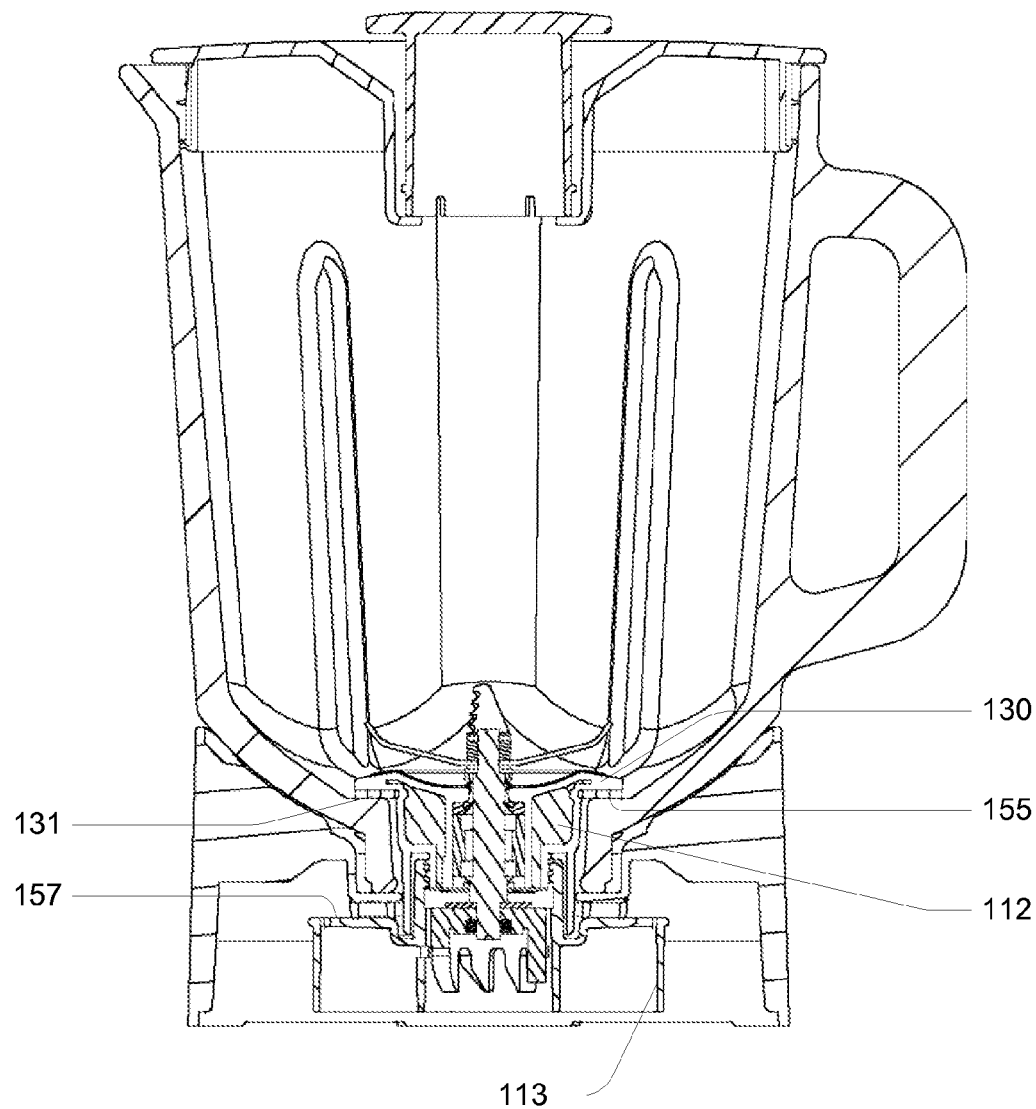
Figure 16:
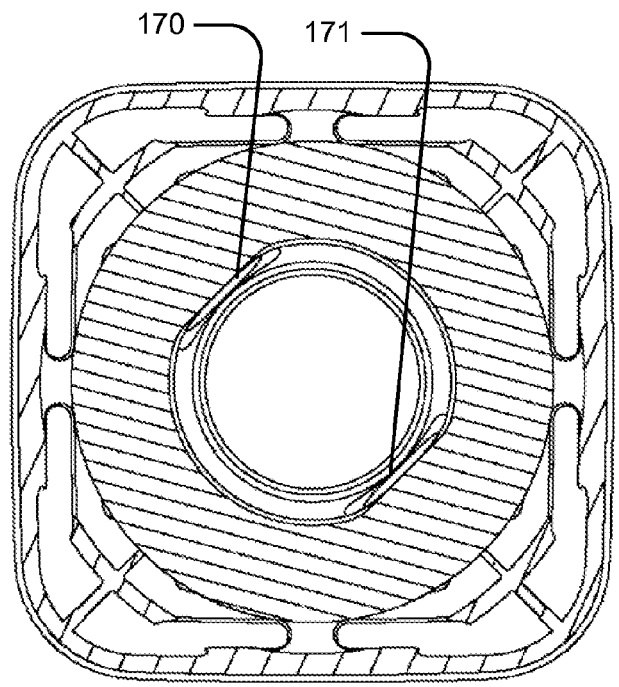
Figure 17:
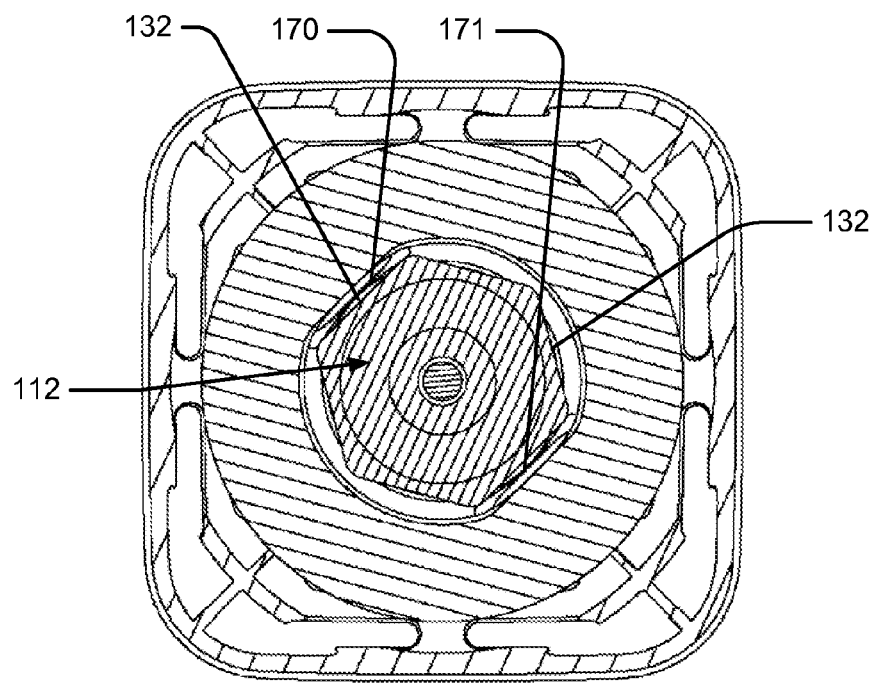

FIG. 10 is an exploded perspective view of a jug, removable blade assembly and lid;

FIG. 11 is a perspective underside view of the device depicted in FIG. 10;

FIG. 12 is a perspective view of a removable blade plug;

FIG. 13 is a cross-section of the device depicted in FIG. 12;

FIG. 14 is a cross-section of the device depicted in FIG. 10;

FIG. 15 is a cross-section through the throat of a jug;

FIG. 16 is a cross-section showing the location for a removable blade plug in the throat; and FIG. 17 is a cross-section showing the location of the removable blade plug in the throat.

BEST MODE AND OTHER EMBODIMENTS

Figure 1:
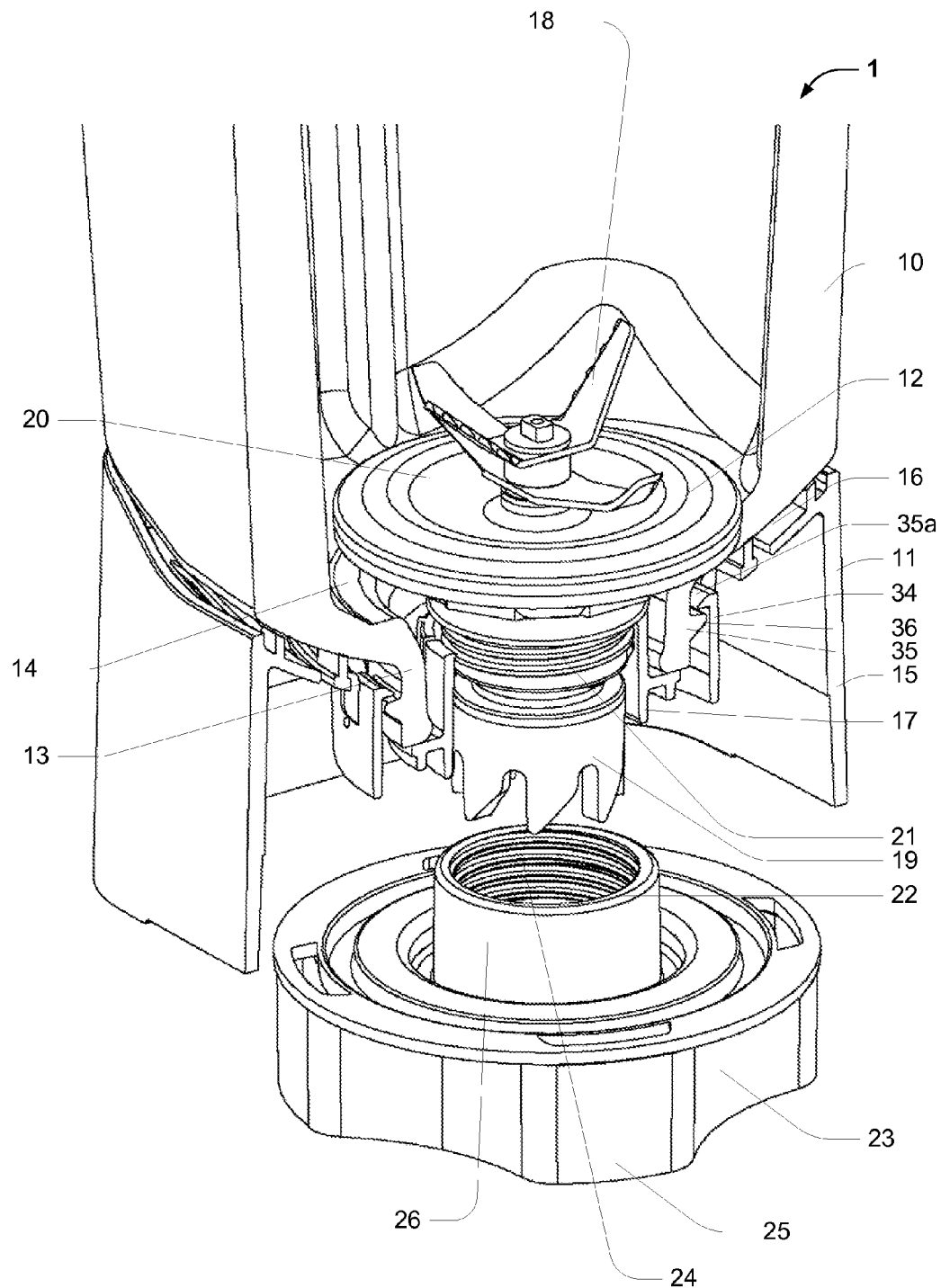
FIG. 1 is a cross sectional view, exploded to show a stabilizing ring in accordance with the teachings of the present invention.

As shown in FIG. 1, a blender jug 1 comprises a vessel 10 usually having a handle (not shown), a separate injection moulded polymer collar 11 and a blade assembly 12. The vessel 10 may be fabricated from plastic or glass. The mechanism and concepts of the present invention are particularly well suited to glass vessels 10. The vessel 10 has a throat 13 and a flat circumferential landing 14 surrounding the throat 13. The collar 11 comprises an exterior skirt 15, generally funnel shaped upper surface 16 for receiving the vessel 10, a centrally located stabilising ring 17 as well as other features that assist with locating an retaining the vessel 10 relative to the collar 11.

The blade assembly 12 comprises one or more rotating blender blades 18 that are carried by a shaft that connects to the jug coupling 19. The body of the blade assembly 12 comprises a flange 20 located below the rotating blades 18 and a threaded portion 21 located below the flange 20. The blade coupling 19 is smaller in diameter than either the flange 20 or the threaded portion 21. This arrangement allows the blade coupling 19 to be inserted (from above) into the central opening 22 of a locking ring 23. Threads 24 within the main bore of the locking ring engage cooperating threads on the threaded area 21 of the blade assembly. Thus, rotation of the locking ring draws the cylindrical neck 26 into the stabilising ring 23 and draws the blade assembly 12 down onto the flat circumferential landing 14. A polymeric seal between the flange 20 and the landing 14, when in compression, prevents leakage through the throat 13.

Figure 2:
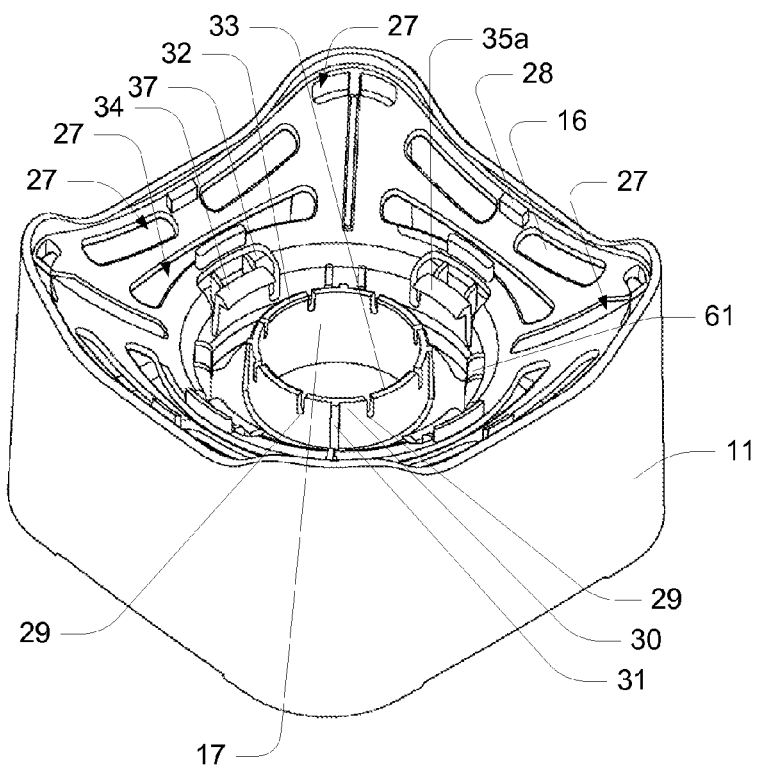
FIG. 2 is a perspective view of a jug collar.

As shown in FIG. 2, the collar 11 is shown from the top. The upper surface 16 features various drain openings 27 that facilitate cleaning and drying. The upper surface 16 also features upright lugs 28 that assist in establishing the correct orientation and spacing of the vessel 10 relative to the skirt 11. The stabilising ring 17 is shown in the centre of the skirt 11. The upper portion of the stabilising ring 17 includes a number of vertical slots 29 that define, between one another, tabs. Some tabs 30 are stiffened by outward extending, vertical reinforcing ribs 31. In this example, every other tab features a vertical reinforcing rib 30. The vertical reinforcing ribs 30 create a stable reference diameter about the interior of the stabilising ring 17. The tabs that are not reinforced are more flexible. The flexible tabs 32 have inner most edges 33 that are formed to include a retaining lip or bead. FIG. 2 also illustrates, surrounding the stabilising ring 17, an array of four flexible teeth 34 that are adapted to engage a tapered ring-like shoulder 35 that is formed at or close to the terminal extremity of the vessel's throat 13. The teeth 34 have an upper ramped surface 35a and flex enough that the lower ramped surface 36 that surrounds the exterior of the vessel's throat can flex the teeth 34, travel past it and then be captured when the teeth return to their original shape. Upright backstops 37 are located behind each tooth 34 and provide a limit to the travel of the individual teeth.

Figure 3:
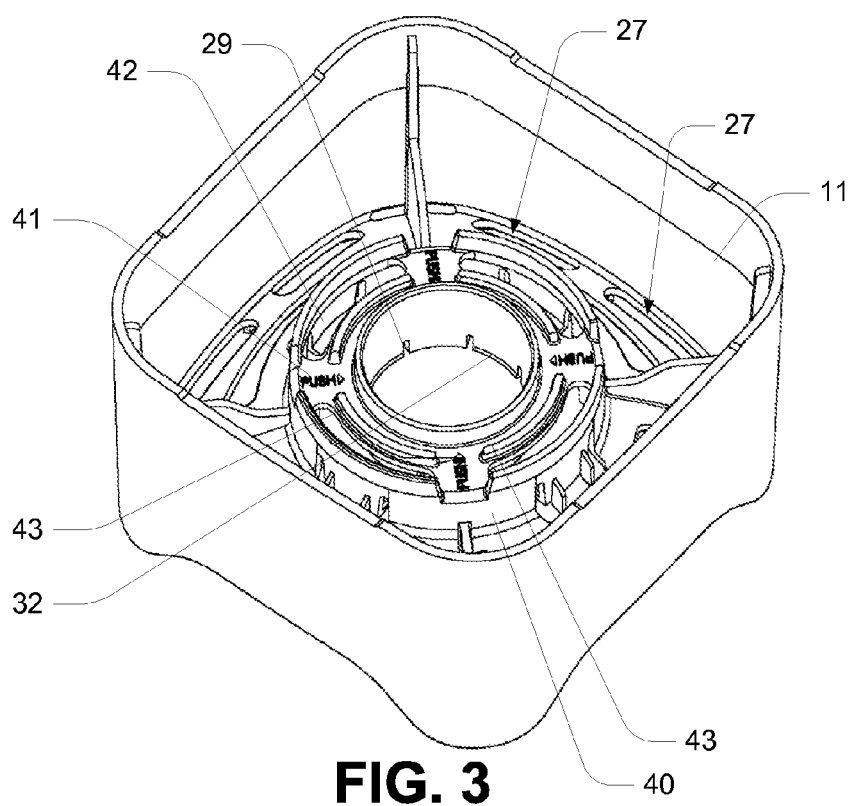
FIG. 3 is an inverted prospective view of the device depicted in FIG. 2.

FIG. 3 shows the jug collar in an inverted perspective view. This view shows the alternation of flexible and rigid tabs about the upper extent of the stabilising ring. This view also illustrates that the stabilising ring 17 is affixed to an outer ring 40 of the skirt by a horizontal web 41. The horizontal web 41 is perforated in various locations 42 to provide for easier cleaning and draining. The underside of the web 41 further comprises integral arcuate circular segments 43 that define a landing or travel limit to tightening of the lock nut 23.

Figure 4:
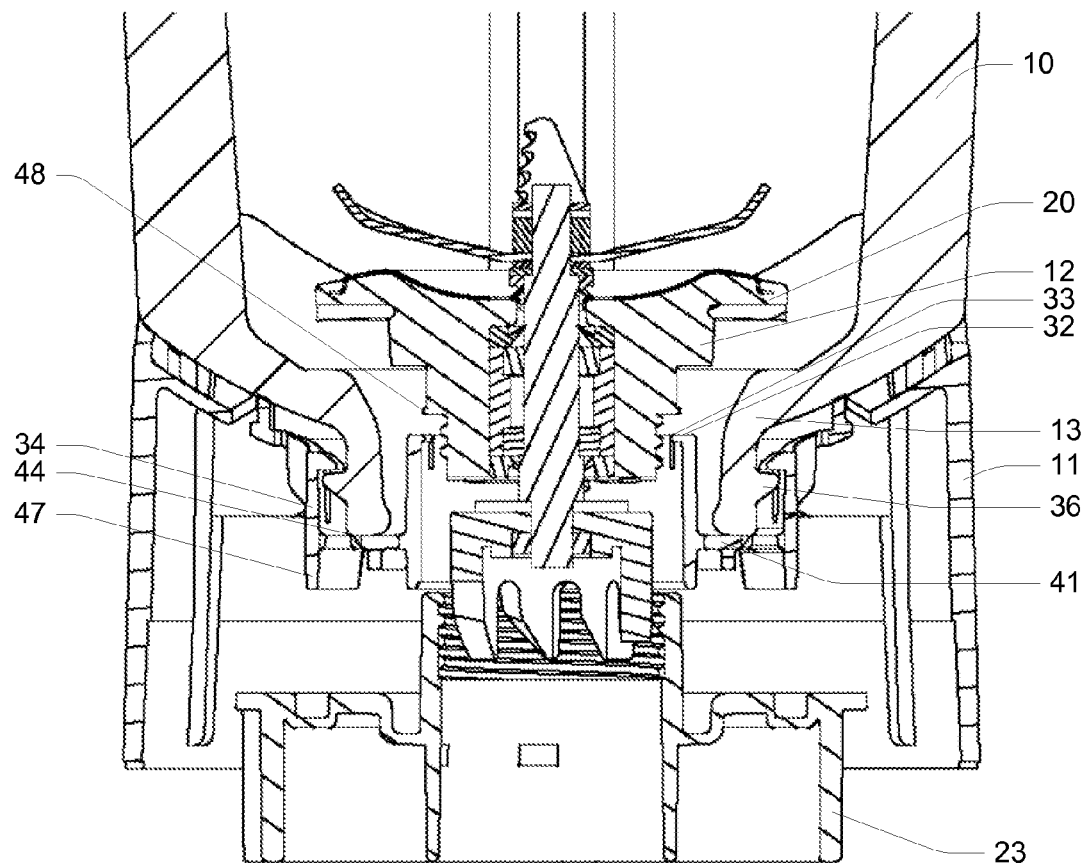
FIG. 4 is a cross section of a jug, blade assembly, collar and lock nut.

FIG. 4 illustrates the partial assembly of the vessel 10, blade assembly 12, skirt 11 and lock nut 23. As illustrated, the body of the blade assembly 12 (apart from the flange 20) is adapted to enter the throat area 13. The upper surface of the web 41 is in contact with or in close proximity to the terminal end 44 of the throat 13. This is because the ramped lower surface 36 of the throat's exterior circumferential ridge has been pushed past the ramped upper surfaces 35a of the skirt's teeth 34. In this orientation, the vessel 10 and the skirt 11 can only be disengaged by outward flexing of the teeth 34. This can be done by squeezing together the lower tips 47 of the teeth 34, these being those portions of the teeth located below or opposite the web 41. FIG. 4 also illustrates that the internal diameter of the bead 33 is smaller than the exterior diameter of a circumferential rim 48 located approximately midway along the length of the body of the blade assembly. When fully engaged (and as shown in FIG. 5) the bead will flex ride past the rim 48, thus preventing the blade assembly from escaping the skirt, even if the lock nut is removed.

Figure 5:
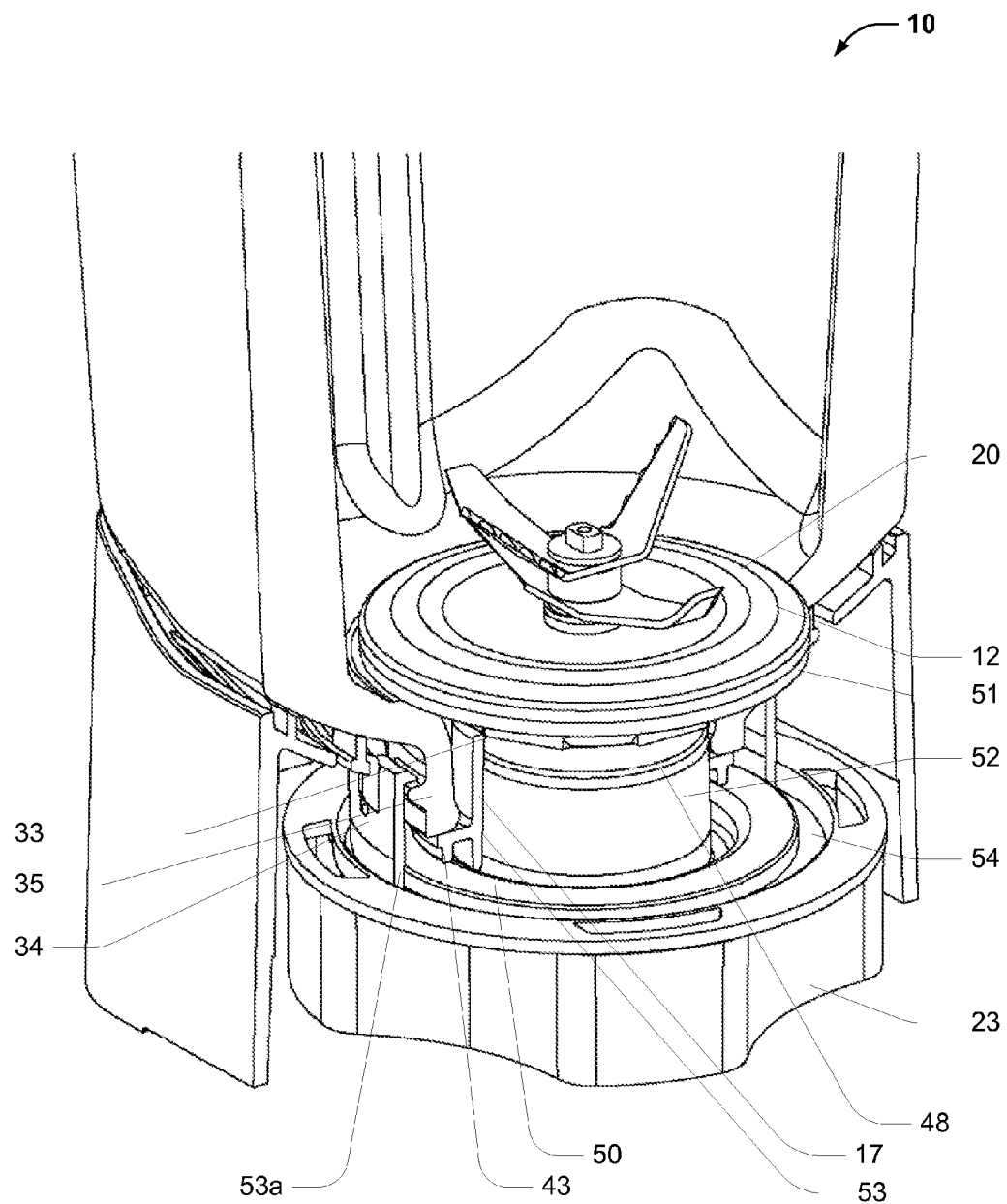
FIG. 5 is a cross sectional view of a jug depicting the throat area.

FIG. 5 illustrates the lock nut 23 fully tightened against the threads of the blade assembly 12. In this orientation, the jug 10 is ready to be used. Characteristic of this orientation, the under surface of the travel limit 43 is in engagement with an upper surface 50 of the lock nut 23. Additionally, the seal 51 under the flange 20 is in compression. The non-rotating and major diameter 52 of the body of the blade assembly is retained by the inner surface 53 of the stabilising ring 17. The lower ends 53a of the teeth 30 are accommodated by a groove 54 located on an upper surface of the lock nut 23. The retaining bead 33 is shown as being located above the rim 48 on the blade assembly. Thus, the stabilising ring 17 provides an accurately located, dimensioned and shaped pilot that receives the body of the blade assembly. Accurate location of the stabilising ring 17 relative to the vessel 10 is assured because of the piloting between the outer tip of the throat's ramped outer ring relative to the interior surfaces of the teeth 34. Further, and as shown in FIG. 6, the throat area 13 of the vessel 10 further comprises vertical ribs 60 that engage with slots 61 formed radially outward of the upper portion of the stabilising ring 17 (see FIG. 2).

FIG. 7 illustrates another embodiment of the invention. In this example, lock nut 70 that lacks an obvious external grip or sidewall 25 (see FIG. 1). The lock nut 70 serves essentially the same purpose but is more difficult to remove, for want of an obvious gripping surface 25. In this example, the circumferential flange or web 71 fits within the internal diameter defined by the interior surfaces 72 of the collar's teeth 34. The installed orientation of this type of lock nut 70 is depicted in FIG. 8. Note that the region below the intermediate flange 71 further comprises an array of small tabs or ribs 75. Although this type of lock nut 70 is intended to be difficult to remove without tools, the vessel itself provides its own tool. For example, the lid of the vessel 10 may be provided with a central opening through which foods and liquids are introduced into the vessel. This opening is (as is known in the art) removably plugged with a cap that also serves as a measuring cup (as shown in FIG. 9). In some embodiments of the invention, rim or mouth 91 of the cylinder shaped measuring cup 92 is provided with vertical slots 93 that are spaced apart and sized to cooperate with the ribs 75. Accordingly, the internal diameter of the cup 92 is larger than the external diameter of the lower portion 76 (see FIG. 8). In this way, the slots 93 engage the various ribs 75 allowing a user to major rim 94 of the cap shown in FIG. 9 and apply counter clockwise torque to a locking rim 71 of the type shown in FIG. 8.

It will be appreciate that the aforementioned system can provide even grade concentricity and stability of the blade assembly relative to its jug.

A blender comprises a motorised base having an external motor driven coupling. The base is adapted to removably receive components depicted in FIG. 10. These components are a jug 110, a lid for the jug 111 and a removable blade assembly 112, 113. The removable coupling assembly further comprises a removable blade plug 112 and a locking ring 113.

FIG. 11 shows, in inverted perspective view, the coupling component 121 of the blade plug assembly, protruding through the base of the jug 110 and being engaged with the locking ring 113. The coupling component 121 protrudes through the base of the jug 110 and is accessible from below. The coupling component 112, being accessible from below the jug or vessel, engages the co-operating coupling component on the base of the blender (not shown). Rotation of the coupling component 121 causes the blades 122 to rotate.

As shown in FIG. 12 the removable blade plug 112 comprises an interior sleeve 123 with exterior threads 124, and surrounding it, an external sleeve 125. The external sleeve further comprises, in this example, two integral and flexible tongues 126. In this example, the tongues or clips 126 are located diametrically opposite one another. Each tongue has, at a lower extremity a ridge or bead 127. The tongue is surrounded on three sides by a through opening 128 allowing the tongue to flex, primarily in the area around the root 129 of the tongue. The rotating coupling component 121 (as will be explained) is attached by a shaft assembly 120 to the rotating blades 122. The integral plug body further comprises a circular flange 130 below which is located a removable, wedge shaped, circular polymeric seal 131 having a central opening for receiving the plug body. A circumferential area below the flange 130 and above the tongue 126 comprises an array of guide flats 132. In this example, six distinct flats 132 are provided around the circumference of the outer sleeve, separated from one another by gaps 133.

As shown in more detail in FIG. 13, the removable plug assembly 112 is seen as having a plug body 140 comprising a solid acetal polymer core 141 that is overmoulded with an external acetal polymer exterior 142. The exterior 142 incorporates the flange 130, the threaded inner sleeve 123, the outer sleeve 125 and the clips 126. A round stainless steel cap 143 is moulded into and onto the upper surface of the flange 130. The stainless steel cap 143 has a shoulder 144 that is moulded into the thickness of the flange 130. A groove 145 in the over moulded exterior, located below the flange, receives the polymeric seal 131. The shaft assembly 120 inter connecting the coupling component 121 with the rotating blades 122, comprises a lower abutment shoulder 146 below which is located a steel washer 147. The coupling component 121 is tightly captured between the shoulder 146 and its washer 147 by a fastener 148. The fastener is additionally retained by the plastic deformation of the end of the shaft 120. The shaft passes through a spaced apart bearing assembly 149 having "Y" 150 seals at each end.

It will be appreciated that the seal element 131 can, by way of example only, be wedge shaped. This can provide a compression seal, in which pressure is applied in a vertical direction between the top and bottom surfaces of the seal. Typically the seal element is an annular or toroidal seal element having a substantially wedge shaped cross section, wherein the outer edge is thicker (or longer) than the inner edge. Alternatively the seal element 131 can have a substantially rectangular cross section.

As shown in FIG. 14, a jug, for example a glass jug, maybe provided with a central throat 151 for receiving the blade plug assembly 112. The throat 151 comprises a vertical neck 152 and adjacent to the neck, on the floor of the interior of the jug, a circumferential flat landing 153. The jug is supported above the motor by the jug's lower housing 154. The housing 154 has a central opening surrounded by a flat landing 155. When the blade plug 112 is fully inserted into the throat, the ridges or beads 127 of the tongues or clips 126 flex to pass the landing 155 and return to their original rest position with the beads 127 now located below the landing 155. Before the locking collar 113 is attached to the plug 112 or after it is removed, a user can remove the plug 112 by exerting enough force on it to overcome the resistance imposed by the beads 127. However, the resistance offered by the beads 127 is sufficient to keep the plug 112 in place, even when the jug is inverted. This facilitates handling, pouring and cleaning operations when the collar 113 is not present.

As further suggested by FIG. 14, the locking ring 113 further comprises an internally threaded collar 156 that extends above the ring's integral flange 157. Vertical walls 158 integral with the flange provide gripping surfaces for rotating the locking ring. A groove 159 between the internally threaded collar 156 and the flange 157 receives the lower extent of the outer sleeve 125 of the removable blade plug 112.

As shown in FIG. 15, rotation of the locking collar 113 relative to the removable blade plug 112 advances the internal threads of the collar 113 onto the external threads of the inner sleeve of the removable blade plug 112. As the plug's flange 130 and ring's flange 157 are urged together by the cooperation of the threads, the polymeric seal 131 is brought into compression between the plug's flange 130 and the flat landing 155 of the jug. The engagement and eventual compression of the seal 131 prevents the contents of the jug from leaking past the seal 131.

As shown in FIG. 16, a portion of the jug's throat, located below the flat landing bracket comprises, in this example, a pair of diametrically opposed flat bumpers 170,171. As suggested by FIG. 17, these opposed flat bumpers 170,171 engage the flat protrusions 32 that are arranged the outer sleeve of the removable coupling plug 112. The interaction between the flat protrusions 132 and the flat bumpers 170, 171 prevents the removable coupling 112 from rotating once these co-operating surfaces are engaged. Thus, the plug will not rotate when acted on by the rotation of the coupling components 121.

One of the advantages of this arrangement is that when the jug is manufactured from glass, imprecise tolerances do not thwart the seating of the plug 112, its any rotating relationship with respect to the bumpers 170, 171 or the seating engagement between the plug's flange 130, the polymeric seal 131 or the jug's flat landing 155.

It will be appreciated that the teachings of the invention are applicable to both glass and polymeric jugs are not withstanding that with respect to manufacturing processors, the aforementioned teachings are well suited for glass jugs.

While the present invention has been disclosed with reference to particular details of construction, these should be understood as having been provided by way of example and not as limitations to the scope or spirit of the invention.

Although the invention has been described with reference to specific examples, it will be appreciated by those skilled in the art that the invention may be embodied in many other forms.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

As used herein, unless otherwise specified the use of terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader, or with reference to the orientation of the structure during nominal use, as appropriate. Similarly, the terms "inwardly" and "outwardly" generally refer to the orientation of a surface relative to its axis of elongation, or axis of rotation, as appropriate.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

The claims defining the invention are as follows:

1. A blender jug assembly including:
   a vessel having a throat located at a floor of the interior of the vessel;
   a collar located at a base of the vessel, and the collar defining a jug skirt;
   a plug element being located from within the interior of the vessel and partially through the throat and engages the collar;
   the plug element having a blade module comprising one or more blades;
   the plug element having a first coupling component, the first coupling component being engaged to the one or more blades by a rotatable shaft assembly supported by the plug element, the first coupling component being accessible from below the vessel for engaging a co-operating second coupling component on a motorised blender base; and
   wherein the plug element and collar include co-operating retaining elements, which include one or more tabs having a retaining lip that engages a rim to releasably couple the plug element to the collar and resist separation of the plug element and collar when fully engaged.

2. The blender jug assembly according to claim 1, wherein the collar comprises the tabs, the tabs being releasably coupled to the plug element for retaining the plug element within the vessel.

3. The blender jug assembly according to claim 2, wherein the collar is reliably coupled to the vessel, such that a portion of the floor of the interior of the vessel is retained between the plug element and the collar.

4. The blender jug assembly according to claim 3, wherein the collar has a centrally located stabilising ring for locating the vessel.

5. The blender jug assembly according to claim 4, wherein the collar includes a plurality of upright lugs that maintain correct orientation and spacing of the vessel relative to the jug skirt.

6. The blender jug assembly according to claim 1, wherein the plug element comprises the tabs, the tabs being releasably coupled to the collar for retaining the plug element within the vessel.

7. The blender jug assembly according to claim 6, wherein the collar is reliably coupled to the vessel, such that a portion of the floor of the interior of the vessel is retained between the plug element and the collar.

8. The blender jug assembly according to claim 7, wherein the plug element comprises an interior sleeve portion having an exterior thread; and an exterior sleeve portion surrounding the inner sleeve portion, wherein the tabs are located within the exterior sleeve.

9. The blender jug assembly according to claim 8, wherein the exterior sleeve portion further comprises two integrally formed tabs in the form of flexible tongue elements; each tongue element has a ridge protrusion proximal a lower extremity; the collar having a central opening surrounded by an substantially flat underside landing, for releasable retaining engagement with the ridges of the tongues of the assembly.

10. The blender jug assembly according to claim 1, wherein the collar is releasably engaged to the vessel, the collar including one or more flexible teeth that engage a shoulder formed proximal to the terminal extremity of the throat for capturing the vessel.

11. The blender jug assembly according to claim 1, the assembly further includes a locking nut in threaded engagement with the plug element while abutting the collar, wherein a portion of the floor of the interior of the vessel is clamped between the plug element and the collar.

12. The blender jug assembly according to claim 11, wherein the locking nut has an annular abutment surface for clamping abutment against the collar.

13. The blender jug assembly according to claim 1, wherein the plug element further comprises an annular flange; an annular seal element is located below the annular flange; a circumferential groove is located below the flange for receiving an portion of the seal element.

14. The blender jug assembly according to claim 13, wherein the plug element comprises an externally threaded portion located below a flange.

15. The blender jug assembly according to claim 14, the assembly further includes a locking nut in threaded engagement with the plug element while abutting the collar, wherein a portion of the floor is clamped between the plug element and the collar.

16. The blender jug assembly according to claim 13, wherein, the collar includes one or more flexible teeth adapted to engage a shoulder formed proximal to the terminal extremity of the throat for capturing the vessel.

* * * * *